United States Patent [19]

Just

[11] Patent Number: 4,925,575
[45] Date of Patent: May 15, 1990

[54] SYSTEM FOR SEPARATING PHASES OF A LIQUID STREAM

[76] Inventor: Gerard A. Just, 333 Holly Creek Ct., #1507, The Woodlands, Tex. 77381

[21] Appl. No.: 294,353

[22] Filed: Jan. 9, 1989

[51] Int. Cl.⁵ .......................................... B01D 17/035
[52] U.S. Cl. .................... 210/706; 210/776; 210/201; 210/219; 210/221.2; 210/258; 261/30; 261/93; 261/122; 209/169
[58] Field of Search ............... 210/703, 706, 776, 219, 210/221.2, 258, 201; 261/30, 93, 122; 209/169, 170

[56] References Cited

U.S. PATENT DOCUMENTS

| | | | |
|---|---|---|---|
| 1,285,061 | 3/1918 | Daman | 209/169 |
| 1,374,445 | 4/1921 | Greenawalt | 209/169 |
| 1,374,446 | 4/1921 | Greenawalt | 209/169 |
| 3,041,050 | 6/1962 | Nelson et al. | 209/169 |
| 3,371,779 | 3/1968 | Hollingsworth et al. | 261/87 |
| 3,865,721 | 2/1975 | Kaelin | 261/93 |
| 3,972,815 | 8/1976 | O'Cheskey et al. | 210/219 |
| 4,000,227 | 12/1976 | Garrett | 210/219 |
| 4,166,086 | 8/1979 | Wright | 210/219 |
| 4,272,461 | 6/1981 | Franklin, Jr. | 210/219 |
| 4,290,885 | 9/1981 | Kwak | 210/219 |
| 4,620,926 | 11/1986 | Linck et al. | 210/221.2 |

Primary Examiner—Richard V. Fisher
Assistant Examiner—Cynthia L. Nessler
Attorney, Agent, or Firm—Hubbard, Thurman, Turner & Tucker

[57] ABSTRACT

A system for separating phases of a liquid stream, comprising a plurality of members each member having an inlet and an outlet such that the outlet of one member is connected to the inlet of another with members being horizontally or vertically stacked in relation to each other. Each member comprises: a container for holding liquid to be treated; a vessel for receiving the liquid stream from the container; a first means in communication with the vessel at one point for selectively introducing into the vessel a gaseous body; a second means in communication with the vessel positioned downstream of first means for selectively introducing into the vessel a liquid stream and for advancing the gaseous body through the vessel at a selectable rate, a power means for motivating both first and second means, an impeller means positioned at one end of the power means and within the vessel for mechanically agitating the liquid stream in order to urge the gaseous body into combination with the liquid stream and a vacuum initiating means within the vessel and upstream of the impeller means.

4 Claims, 2 Drawing Sheets

SYSTEM FOR SEPARATING PHASES OF A LIQUID STREAM

BACKGROUND OF THE INVENTION

1. FIELD OF THE INVENTION:

This invention relates to the separation of phases in a liquid stream by mechanical production of a gas which brings the separated phase, including particulate matter, to the liquid surface.

2. DESCRIPTION OF THE PRIOR ART:

In industry it is frequently necessary to separate phases of a liquid body. An example is a separation of oil from other fluids as required in the oil and gas industry. Phase separation is accomplished by mechanically producing a gas in a fluid body. This gas rises to the surface of the fluid bringing the separated fluid phase or particulate matter to the fluid surface. Once upon the surface, the separated phase or particulate matter is skimmed off. To accomplish mechanical gas production the prior art uses special tanks in conjunction with vertical rotor arrangements connected to vaned rotors. However, the prior art has encountered several problems in that specially designed tanks are required which cannot be vertically stacked. Thus, tanks must be layed out in horizontal rows which take up large amounts of space. In addition, the vertical motor and vaned rotor arrangement cannot be precisely controlled to regulate gas production nor is the arrangement very efficient.

SUMMARY OF THE INVENTION

The present invention provides a method of separating phases of a liquid, including particulate matter in suspension. The invention comprises a container for holding a liquid to be separated, a vessel for receiving a liquid stream from the container, a first means in communication with the vessel at one point for introducing into the vessel a gaseous body which may be direct from the atmosphere or from a regulated gas supply, a second means in communication with the vessel positioned downstream of the first means for selectively introducing into the vessel a liquid stream and for advancing the gaseous body through the vessel at a selectable rate, a power means for motivating both first and second means, an impeller means positioned at one end of the power means and within the vessel for mechanically agitating the fluid in order to urge the gaseous body into combination with the liquid stream, and a vacuum initiating means within the vessel and upstream of the impeller. The invention can have members vertically stacked which provide both space savings and an application use of allowing the fluid which is to be treated to be processed several times by cycling from one unit to the next.

DESCRIPTION OF THE PREFERRED EMBODIMENTS

Figure 1:
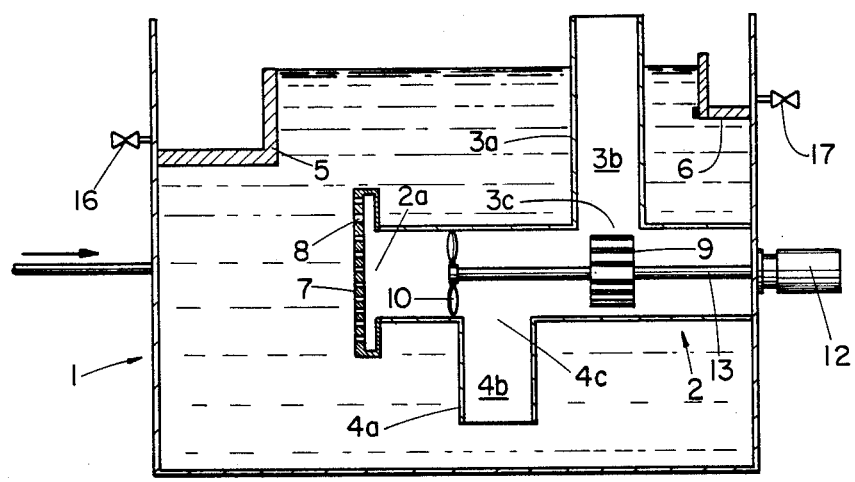
FIG. 1 is a cross section schematic illustrating the various components of the phase separation system.

FIG. 1 is cross section view of the phase separation system. A container 1 holds liquid to be treated. Liquid is moved from container 1 to vessel 2 for treatment. Vessel 2 is immersed in the liquid in container 1. Vessel 2 is in communication with tube 3a with inside cavity 3b at port 3c. Tube 3a provides a means for gas entry into vessel 2. Tube 3a is open at each end and can be opened to the atmosphere or attached to a gas supply, not shown. Liquid enters vessel 2 through tube 4a with inside cavity 4b at port 4c which is in communication with vessel 2. At interior end 2a of vessel 2 is diffusion means 7. Diffusion means 7 may take the form of ports shown in FIG. 1 as 8. The purpose of diffusion means 7 is to allow gas and liquid to be expelled from vessel 2 into container 1.

Positioned within vessel 2 in close proximity to port 3c is vacuum initiating means 9. In the preferred embodiment as shown in FIG. 1, the vacuum initiating means is shown as a squirrel cage vacuum draw. Those skilled in the art know there are other ways to accomplish the vacuum initiating means. The purpose of vacuum initiating means 9 is to introduce a gas body through tube cavity 3b into vessel 1. Also positioned within vessel 2 in close proximity to port 4c and downstream of vacuum initiating means 9 is liquid induction means 10. In the preferred embodiment as shown in FIG. 1 the liquid induction means is shown as an impeller. Those skilled in the art will recognize other equivalent ways to accomplish the liquid induction means. The purpose of impeller 10 is to introduce a liquid stream through port 4c into vessel 2 and to advance the gas drawn into vessel 2 by squirrel cage vacuum draw 9 through vessel 2.

Power means 12 is shown as an AC electric motor in the preferred embodiment, however, it may be a diesel motor, a steam turbine or any other power means used to rotate a shaft. As shown in FIG. 1, power means 12 is external to vessel 2 in container 1 but those skilled in the art are familiar with drive means that could be located internally to container 1 and vessel 2. The purpose of power means 12 is to turn shaft 13. Attached to shaft 13 is impeller 10 and squirrel cage vacuum draw 9. As shaft 13 is rotated squirrel cage vacuum draw 9 and impeller 10 are also rotated. The function of power means 12 is to rotate shaft 13 at varying speeds. Although not shown, an alternate means of rotating shaft 13 which rotates impeller 10 and squirrel cage vacuum draw 9 is to have tandem shafts rotated by separate drive means with one shaft rotating impeller 10 and the other shaft rotating squirrel cage vacuum draw 9.

Attached to container 1 is weir 5. A preferred embodiment of weir 5 is a wall height lower than the container fluid level. Also attached to container 1 is weir 6. A preferred embodiment of weir 6 is an adjustable wall height. Drain valves 16 and 17 are shown in FIG. 1. In operation a separated phase has been brought to container 1 fluid surface. Fluid flows over weir 5 and through drain valve 16 to the next downstream container for further phase separation. Separated phase skimmings flow over weir 6 for skimming then removal through drain valve 17.

Figure 2:
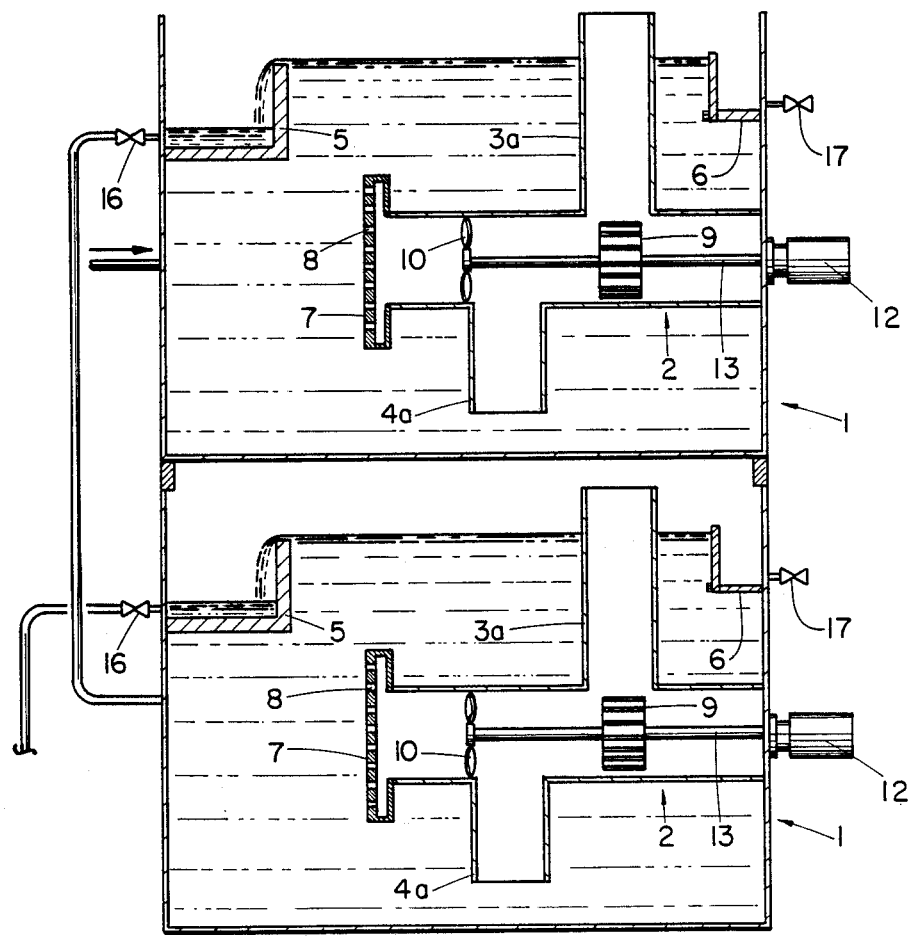
FIG. 2 is a cross section schematic illustrating the vertical stack arrangement of multiple phase separation systems.

FIG. 2 shows a preferred embodiment of several phase separation systems vertically stacked allowing space savings.

Figure 3A:
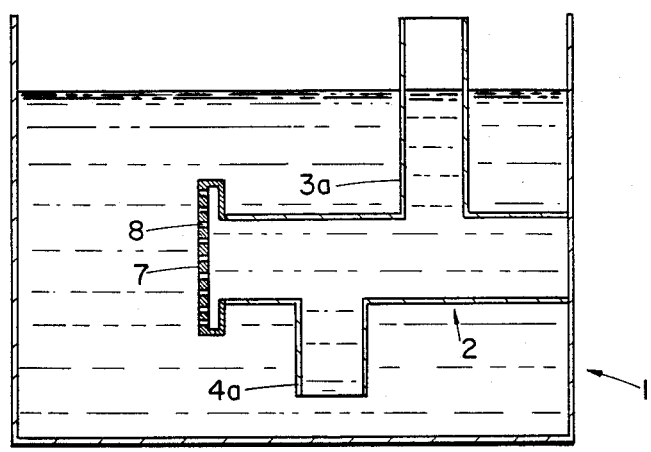
FIG. 3A is a cross section schematic of the phase separation system prior to activation.
Figure 3B:
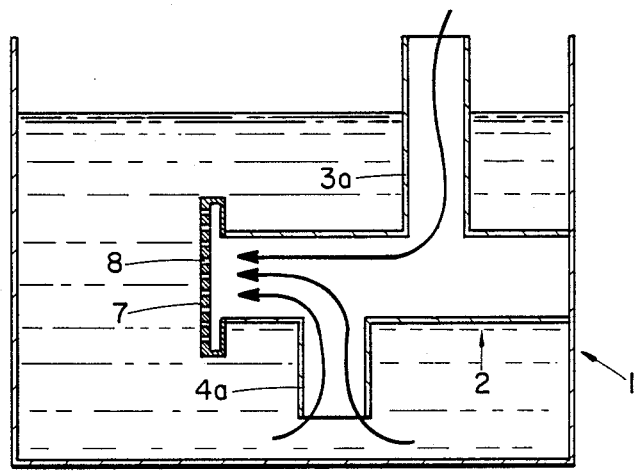
FIG. 3B is a cross section schematic of the phase separation system at initial startup.
Figure 3C:
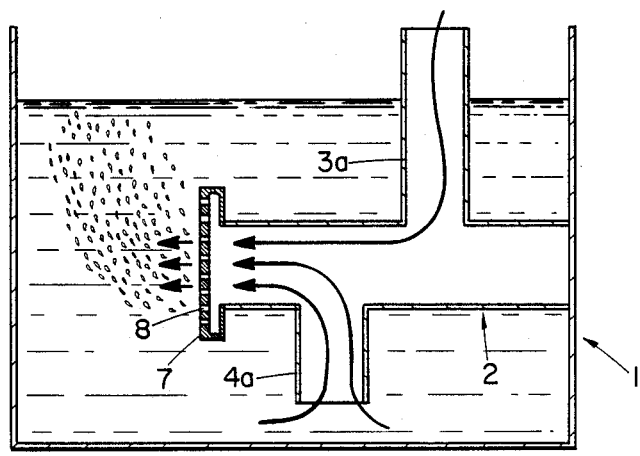
FIG. 3C is a cross section schematic of the phase separation system during steady state operation.

Operation of the phase separation system is shown in FIG. 3A, 3B, and 3C. FIG. 3A is a flow diagram showing the phase separation system at rest. Liquid from container 1 has flooded the interior of vessel 2.

FIG. 3B shows the phase separation system at initial startup. Power means 12 has begun to rotate shaft 13. As shaft 13 begins to rotate then squirrel cage vacuum draw 9 and impeller 10 also begin to rotate. The rotation of squirrel cage vacuum draw 9 draws gas down inside cavity 3b into vessel 2. As impeller 10 begins to rotate, liquid from container 1 is drawn into vessel 2 through cavity 4c.

FIG. 3C shows the phase separation system during steady state operation Gas is drawn into vessel 2 through cavity 3c by rotation of squirrel cage vacuum draw 9. Liquid is drawn into vessel 2 through cavity 4c by rotation of impeller 10. Liquid flow through vessel 2 also draws gas previously drawn inside vessel 2 through the vessel. Liquid and gas are then discharged from vessel 2 through diffuser 7 by way of ports 8. The discharge gas rises to container 1 surface causing phase separation and particulate matter to also be brought to the surface. Once upon the fluid surface, the separated phase and/or particulate matter is skimmed from the fluid surface by way of weir 6. The skimmings are then drained from container 1 by drain valve 17. Fluid from the container surface also flows over weir 5 and is discharged from container 1 through drain valve 16. Fluid is discharged from drain valve 16 into the next downstream container for further phase separation.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. Apparatus for separating a mixture of liquid phases of differing densities comprising:
    a tank having a vertically extending wall;
    said tank containing said mixture;
    weir means traversing an upper portion of said tank to remove a surface portion of liquid from said tank;
    a vessel mounted in said tank and immersed in said liquid mixture;
    said vessel defining a central chamber;
    a shaft traversing said central chamber and a portion of said vertical wall of said tank;
    motor means exterior to said tank for rotating said shaft at varying angle speeds;
    a vacuum pump secured to a medial portion of said shaft within said chamber;
    said vacuum pump having a radial inlet and an axial outlet;
    a first vertically extending conduit communicating between the radial inlet of said vacuum pump and the ambient atmosphere above the liquid surface;
    a liquid impeller mounted on the innermost portion of said shaft;
    said impeller having an axial inlet facing the axial outlet of said vacuum pump;
    a second fluid conduit extending generally downwardly from said chamber intermediate the vacuum pump outlet and the impeller inlet, whereby an intimate mixture of air and said liquid mixture is discharged by said impeller below the surface of said liquid mixture to elevate the lighter phase of said liquid mixture to the surface for separation by said weir means.

2. The apparatus of claim 1 further comprising diffusion means in a wall of said vessel adjacent the discharge side of said impeller.

3. The apparatus of claim 1 further comprising means for varying the angular velocity of said shaft.

4. A method of treating a liquid comprising first and second fluid phases in order to effect separation of at least one of said phases from said liquid, comprising the steps of:
    (1) providing a plurality of tanks, each tank having an inlet and an outlet and means connecting said tanks in series relationship, said tanks being horizontally or vertically stacked in relation to each other, each of said tanks being filled with a liquid to be treated and containing a vessel immersed in said liquid;
    (2) introducing from one of said tanks at a controlled rate, a portion of said liquid into said vessel;
    (3) introducing, at a controlled rate, a gaseous body in said vessel in a location upstream of said liquid portion introduction into said vessel, said upstream location being relative to the flow of said liquid portion;
    (4) advancing said gaseous body and said liquid portion horizontally through the vessel at a controlled rate by the suction force producted by the rotating of an impeller;
    (5) expelling said gaseous body and liquid portion from said vessel by said impeller into said tank at a level below the surface of the liquid in said tank to create a stream of rising gaseous bubbles;
    (6) skimming the surface of said liquid to remove the liquid phase brought to the surface by said gaseous bubbles;
    (7) introducing said skimmed liquid phase into the next sequential tank; and
    (8) repeating steps 2-7 through each of the other of said plurality of tanks.

* * * * *